3,204,913
VIBRATION-DAMPING AND LOAD-SUPPORTING APPARATUS

Harold C. Lawrence, Pequannock, and Louis C. Hoch, Nutley, N.J., and C. L. William Bailes, Astoria, N.Y., assignors to Aeroflex Laboratories Incorporated, a corporation of Delaware
Filed Dec. 3, 1962, Ser. No. 241,785
14 Claims. (Cl. 248—358)

This invention relates to vibration-damping and load-supporting apparatus and, while it is of general application, it is particularly useful in supporting, from a vibratory base or platform, very light loads while substantially isolating them from forces of shock and vibration, in any direction, to which the base may be subject.

Heretofore, there have been proposed certain vibration-damping and load-supporting apparatus including lengths of stranded wire cable or rope extending between two rectilinear clamping or securing strips, the support being provided by the stiffness of the short lengths of stranded cable. However, in such prior apparatus of this type, the damping of the vibrations has been effected primarily by supplementary elastic material, such as rubber or synthetic plastic material having similar elastic properties. Such prior supporting apparatus have generally been complex, costly, relatively heavy, and have inherently had spring constants unsuitable for light loads, such as certain precision electronic chassis, and have been incapable of isolation to the degree required to prevent injury to such delicate apparatus.

It is an object of the invention, therefore, to provide a new and improved vibration-damping and load-supporting apparatus for supporting, from a vibratory base or platform, a lightweight load while substantially isolating it from the forces of shock and vibration to which the base may be subject.

In accordance with the invention, there is provided a vibration-damping and load-supporting apparatus for interconnecting a supporting member and a supported member comprising a pair of elements having normally parallel opposed substantially planar surfaces and adapted to be individually connected to said supporting and supported members, a plurality of loops of stranded wire cable, and means for securing opposed points of the plurality of loops to said opposed surfaces, the points of attachment of the loops to each of the surfaces lying in a circular array. The term "loop" is used herein and in the appended claims to refer either to a continuous closed single loop, a continuous series of helical loops, or an open half-loop anchored at each end, in each instance the term "loop" applying only to the active length of cable between points of attachment.

For a better understanding of the present invention, together with other and further objects thereof, reference is had to the following description, taken in connection with the accompanying drawings, while its scope will be pointed out in the appended claims.

Referring now to the drawings:

FIG. 5 is a view in elevation of the apparatus of FIG. 1 including another modified form of cable loop assembly, while

Figure 1:
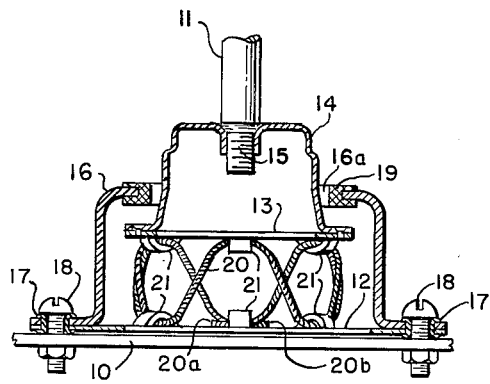
FIG. 1 is a cross-sectional view of a vibration-damping and load-supporting apparatus embodying the invention.

Referring now more particularly to FIG. 1 of the drawings, there is illustrated a vibration-damping and load-supporting apparatus for interconnecting a supporting member, such as a platform 10, and a supported member, such as a stud 11, comprising a pair of elements having normally parallel opposed substantially planar surfaces, for example the normally parallel disc elements 12 and 13, adapted to be connected individually to the supporting and supported members, respectively. For example, the disc element 13 is shown as being riveted at its periphery to a flanged inverted cup-shaped member 14 to which the supported member 11 is securely affixed as by the threaded connection 15. To the disc element 12 is secured a second flanged inverted cup-shaped housing 16 having its peripheral flange secured to the disc element 12 by eyelets 17, 17 or the like providing apertures for bolts 18, 18 for securing the assembly 12, 16 to the supporting platform 10. The housing 16 is provided with an aperture 16a and an annular resilient snubbing element 19 of rubber, elastic plastic, or metallic mesh encasing the periphery of the aperture 16a. The cup-shaped member 14 serves as an external connecting element extending through the aperture 16a and secured to the disc element 13 on the one part and adapted to be connected to the supported member 11, as described.

The apparatus of FIG. 1 further comprises a plurality of substantially sinusoidal loops of stranded wire cable which, in the embodiment of FIG. 1, is shown as a continuous length of stranded wire cable 20 formed into a plurality of loops, the points of attachment of such loops to the surface of each of the disc elements lying in a circular array, that is, a substantially circular array of loops extending around the peripheries of the disc elements 12 and 13. The apparatus further comprises means for securing opposed points of such loops of the cable 20 substantially tangentially to the opposed surfaces of the disc elements 12 and 13. As shown, the cable loops are secured by a series of upsets 21 in the disc elements 12 and 13 which are then deformed to clip the loops of the cable 20 securely to the disc elements. The opposed ends 20a and 20b of the cable 20 are shown as overlapping and being clipped by one of the upsets 21.

It is believed that the operation of the vibration-damping and load-supporting apparatus as embodied in the apparatus of FIG. 1 will be apparent from the foregoing description. Due to the configuration of the array of sinusoidal loops of the cable 20, the supported member 11 is mounted for universal motion with respect to the supporting platform 10 so that shocks and vibration in any direction will be absorbed and transmission thereof to the supported member 11 will be substantially eliminated, the vibration and shock energy being absorbed entirely in the interstrand friction of the cable 20.

Figure 2:
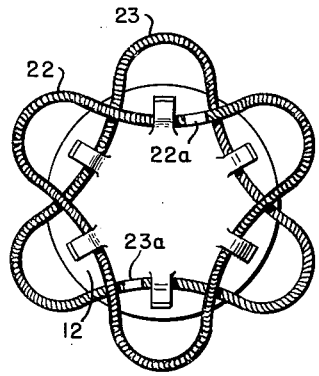
FIG. 2 is a plan view of a modified form of cable loop assembly shown in an intermediate stage of fabrication.

In FIG. 2 is shown, in plan, a modified form of stranded cable array comprising two continuous cable strands 22 and 23, each formed into a group of substantially sinusoidal loops, the loops of the two groups being interleaved. For clarity of illustration, the groups are shown as originally assembled on the disc element 12 before they are raised into a vertical position to be secured to the upper disc element 13. In this case, the cable strands are shown as being individually closed by butt welds 22a and 23a, although the ends may be overlapped and clipped under one of the upset clips, as in the apparatus of FIG. 1. It will be understood that the opposite points of the loops of the cables 22 and 23 will be secured to the upper disc element 13 in the same manner as in the apparatus of FIG. 1.

Figure 3:
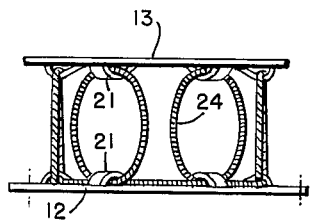
FIG. 3 is a view in elevation of the apparatus of FIG. 1 including a modified form of cable loop assembly.

In FIG. 3 is shown a modified arrangement of the stranded cable loops in which a single continuous length of cable 24 is formed into a plurality of substantially circular loops secured to the disc elements 12 and 13 in the same manner as in the apparatus of FIG. 1.

Figure 4:
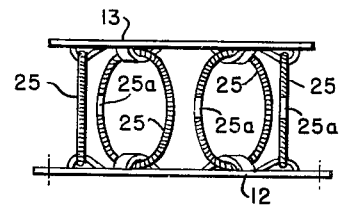
FIG. 4 is a view in elevation of the apparatus of FIG. 1 including another modified form of cable loop assembly.

In FIG. 4 is illustrated a further modification in which the single continuous cable is replaced by a series of separate independent stranded wire cable loops 25, 25, each closed by a butt weld 25a.

Figure 5:
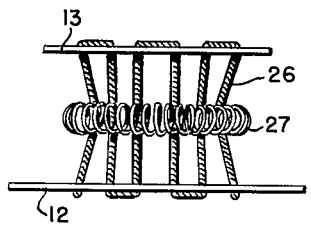

In FIG. 5 is shown a modification of the invention which includes means for securing the opposite points of the loops to the disc elements 12 and 13 so that they extend from the disc elements substantially normal to their opposed surfaces. In this form of the invention, the continuous stranded wire cable 26 is laced back and forth through apertures in the disc elements 12 and 13 and deformed or flattened against the outer surfaces of the disc elements so that they extend from the disc elements substantially normal to their opposed surfaces. The stiffness of the apparatus of FIG. 5 may be increased by providing an elastic belt 27 surrounding and tensioning the array of loops. The belt 27 may be of any elastic form, either a coiled tension spring, as shown, or a solid belt of resilient material. It will be understood that the loops in the stranded wire cable 26 of FIG. 5 may be replaced by the variants of loop formation illustrated in FIGS. 1, 2, 3, and 4.

The vibration-damping and load-supporting apparatus of the invention may be designed to accommodate a wide range of loads and vibration frequencies. One such design which has proved satisfactory in support of light loads of a few pounds included discs 12 and 13 of 1.68 inches diameter spaced by 0.80 inch, between which extended six loops of stainless steel stranded cable of 0.06 inch diameter and 7 by 19 strands.

Figure 6:
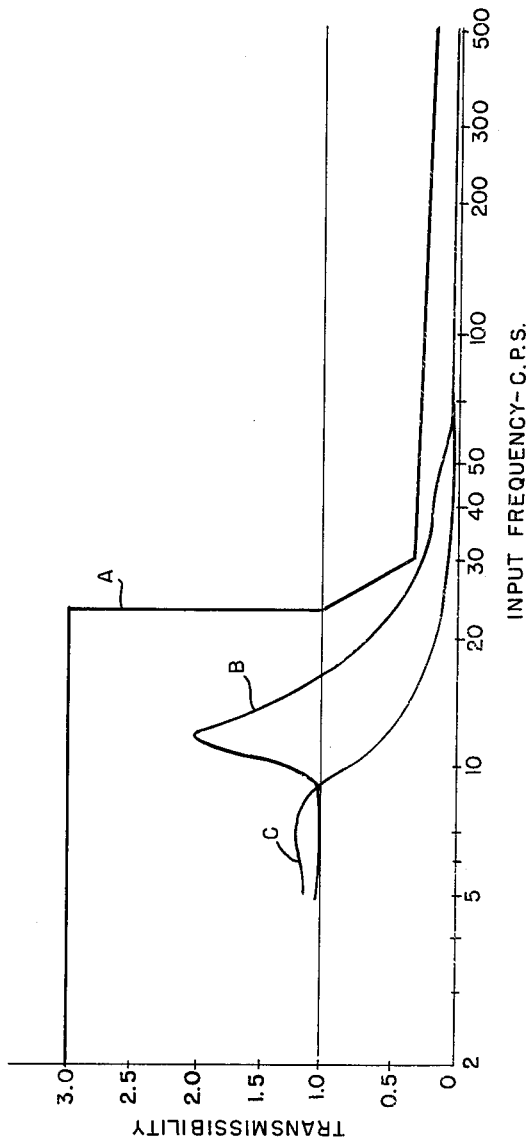
FIG. 6 is a graph showing certain operating characteristics of one specific supporting apparatus embodying the invention.

Referring to FIG. 6, there are represented certain frequency-transmissibility characteristics of typical apparatus, for example of the type shown in FIG. 1. In this figure, Curve A represents what may be termed the transmissibility envelope, that is, the limits of transmissibility set by a particular performance specification. Curve B represents the transmissibility of the apparatus with a load of 12 pounds applied to the supported member 11 while Curve C represents the transmissibility of the apparatus to a load of 30 pounds, in each instance it being assumed that the transmissibility is measured in a vertical direction, as referred to FIG. 1. It is seen that, for all vibration frequencies above approximately 20 cycles in the case of a 12-pound load and approximately 10 cycles in the case of a 30-pound load, the transmissibility is less than unity, falling to an extremely small value for vibration frequencies above 50 cycles per second.

It is to be emphasized that the damping represented by Curves B and C results solely from interstrand friction of the wire cable loops upon deflection and does not require the addition of any other resilient damping material, such as heretofore used in such vibration-damping apparatus. Thus, the apparatus will effectively isolate the supported member 11 for all shock and vibration frequencies substantially above 50 cycles per second. Other apparatus of the type shown in FIG. 1 have been designed to have with their supported load natural resonant frequencies as low as 5 cycles per second and as high as 30 cycles per second, indicating a wide range of natural frequencies attainable, depending upon the application. This characteristic is realized in each of the modified forms of the invention illustrated in FIGS. 2 to 5, inclusive.

An important advantage of the supporting apparatus described is that they perform their load-supporting and vibration-damping functions regardless of attitude or orientation, that is, the supported mass may be inverted vertically or tilted to any intermediate position without affecting the performance of the supporting apparatus unless the deflection is so great as to be limited by the outer housing. Many currently available vibration isolators are effective only when maintained in a fixed plane and lose their isolating capability when inverted or turned on their side, due to the phenomenon normally described as bottoming out against the isolator structure itself.

While there have been described what are, at present, considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A vibration-damping and load-supporting apparatus for interconnecting a supporting member and a supported member comprising:
   (a) a pair of elements having normally parallel opposed substantially planar surfaces and adapted to be individually connected to said supporting and supported members;
   (b) a plurality of loops of stranded wire cable;
   (c) and means for securing opposed points of said loops to said opposed surfaces, the points of attachment of said loops to each of said surfaces lying in a circular array.

2. A vibration-damping and load-supporting apparatus for interconnecting a supporting member and a supported member comprising:
   (a) a pair of normally parallel disc elements adapted to be individually connected to said supporting and supported members;
   (b) a plurality of loops of stranded wire cable;
   (c) and means for securing opposed points of said loops to opposed surfaces of said disc elements, the points of attachment of said loops to each of said disc elements lying in a circular array.

3. A vibration-damping and load-supporting apparatus for interconnecting a supporting member and a supported member comprising:
   (a) a pair of elements having normally parallel opposed substantially planar surfaces and adapted to be individually connected to said supporting and supported members;
   (b) a plurality of loops of stranded wire cable;
   (c) and means for securing opposed points of said loops to said opposed surfaces, the points of attachment of said loops to each of said surfaces lying in a circular array.

4. A vibration-damping and load-supporting apparatus for interconnecting a supporting member and a supported member comprising:
   (a) a pair of elements having normally parallel opposed substantially planar surfaces and adapted to be individually connected to said supporting and supported members;
   (b) a plurality of loops of stranded wire cable;
   (c) and means for rigidly clipping opposed points of said loops to said opposed surfaces, the points of attachment of said loops to each of said surfaces lying in a circular array.

5. A vibration-damping and load-supporting apparatus for interconnecting a supporting member and a supported member comprising:
   (a) a pair of elements having normally parallel opposed substantially planar surfaces and adapted to be individually connected to said supporting and supported members;
   (b) a plurality of loops of stranded wire cable;
   (c) and means for securing opposed points of said loops substantially tangential to said opposed surfaces, the points of attachment of said loops to each of said surfaces lying in a circular array.

6. A vibration-damping and load-supporting apparatus for interconnecting a supporting member and a supported member comprising:
   (a) a pair of elements having normally parallel opposed substantially planar surfaces and adapted to be individually connected to said supporting and supported members;
(b) a plurality of loops of stranded wire cable;
(c) and means for securing opposed points of said loops substantially normal to said opposed surfaces, the points of attachment of said loops to each of said surfaces lying in a circular array.

7. A vibration-damping and load-supporting apparatus for interconnecting a supporting member and a supported member comprising:
(a) a pair of elements having normally parallel opposed substantially planar surfaces;
(b) a plurality of loops of stranded wire cable;
(c) means for securing opposed points of said loops to said opposed surfaces, the points of attachment of said loops to each of said surfaces lying in a circular array;
(d) an apertured cup-shaped housing enclosing said cable loops and adapted to be connected to one of said pair of elements and to one of said supporting and supported members;
(e) and an external connecting element extending through said aperture, secured to the other of said pair of elements, and adapted to be connected to the other of said supporting and supported members.

8. A vibration-damping and load-supporting apparatus for interconnecting a supporting member and a supported member comprising:
(a) a pair of elements having normally parallel opposed substantially planar surfaces;
(b) a plurality of loops of stranded wire cable;
(c) means for securing opposed points of said loops to said opposed surfaces, the points of attachment of said loops to each of said surfaces lying in a circular array;
(d) an apertured cup-shaped housing enclosing said cable loops and adapted to be connected to one of said pair of elements and to one of said supporting and supported members;
(e) an external connecting element extending through said aperture, secured to the other of said pair of elements, and adapted to be connected to the other of said supporting and supported members;
(f) and a resilient snubbing element encasing the aperture in said housing.

9. A vibration-damping and load-supporting apparatus for interconnecting a supporting member and a supported member comprising:
(a) a pair of elements having normally parallel opposed substantially planar surfaces and adapted to be individually connected to said supporting and supported members;
(b) a continuous length of stranded wire cable formed into a plurality of loops;
(c) and means for securing opposed points of said loops to said opposed surfaces, the points of attachment of said loops to each of said surfaces lying in a circular array.

10. A vibration-damping and load-supporting apparatus for interconnecting a supporting member and a supported member comprising:
(a) a pair of elements having normally parallel opposed substantially planar surfaces and adapted to be individually connected to said supporting and supported members;
(b) a continuous length of stranded wire cable formed into a plurality of substantially sinusoidal loops;
(c) and means for securing opposed points of said loops to said opposed surfaces, the points of attachment of said loops to each of said surfaces lying in a circular array.

11. A vibration-damping and load-supporting apparatus for interconnecting a supporting member and a supported member comprising:
(a) a pair of elements having normally parallel opposed substantially planar surfaces and adapted to be individually connected to said supporting and supported members;
(b) a continuous length of stranded wire cable formed into a plurality of substantially circular loops;
(c) and means for securing opposed points of said loops to said opposed surfaces, the points of attachment of said loops to each of said surfaces lying in a circular array.

12. A vibration-damping and load-supporting apparatus for interconnecting a supporting member and a supported member comprising:
(a) a pair of elements having normally parallel opposed substantially planar surfaces and adapted to be individually connected to said supporting and supported members;
(b) a plurality of separate independent loops of stranded wire cable;
(c) and means for securing opposed points of said loops to said opposed surfaces, the points of attachment of said loops to each of said surfaces lying in a circular array.

13. A vibration-damping and load-supporting apparatus for interconnecting a supporting member and a supported member comprising:
(a) a pair of elements having normally parallel opposed substantially planar surfaces and adapted to be individually connected to said supporting and and supported members;
(b) a plurality of loops of stranded wire cable;
(c) means for securing opposed points of said loops to said opposed surfaces, the points of attachment of said loops to each of said surfaces lying in a circular array;
(d) and an elastic belt surrounding and tensioning said array of loops.

14. A vibration-damping and load-supporting apparatus for interconnecting a supporting member and a supported member comprising:
(a) a pair of elements having normally parallel opposed substantially planar surfaces and adapted to be individually connected to said supporting and supported members;
(b) two continuous lengths of stranded wire cable each formed into a group of substantially sinusoidal loops, the loops of the two groups being interleaved;
(c) and means for securing opposed points of said loops to said opposed surfaces, the points of attachment of said loops to each of said surfaces lying in a circular array.

References Cited by the Examiner

UNITED STATES PATENTS

| | | | |
|---|---|---|---|
| 1,671,764 | 5/28 | Dicky | 267—63 |
| 3,039,725 | 6/62 | Kerley | 248—20 |

CLAUDE A. LE ROY, *Primary Examiner.*

FRANK L. ABBOTT, *Examiner.*